United States Patent
Ansari et al.

(10) Patent No.: US 9,033,783 B1
(45) Date of Patent: May 19, 2015

(54) METHODS AND SYSTEMS OF ENABLING USERS TO ACTIVELY ALLOCATE ADVERTISING RESOURCES AND PROMOTE FOLLOWER TRACKING

(71) Applicants: Hazim Ansari, Santa Ana, CA (US); Sanjay Sabnani, Woodland Hills, CA (US)

(72) Inventors: Hazim Ansari, Santa Ana, CA (US); Sanjay Sabnani, Woodland Hills, CA (US)

(*) Notice: Subject to any disclaimer, the term of this patent is extended or adjusted under 35 U.S.C. 154(b) by 46 days.

(21) Appl. No.: 13/675,696

(22) Filed: Nov. 13, 2012

Related U.S. Application Data

(63) Continuation of application No. 12/950,184, filed on Nov. 19, 2010, now Pat. No. 8,328,612.

(51) Int. Cl.
 *G06F 17/00* (2006.01)
 *A63F 13/30* (2014.01)

(52) U.S. Cl.
 CPC .................. *A63F 13/12* (2013.01)

(58) Field of Classification Search
 CPC .................................. A63F 13/12
 USPC .................... 463/5–9; 705/14.73
 See application file for complete search history.

(56) References Cited

U.S. PATENT DOCUMENTS

| | | | | |
|---|---|---|---|---|
| 2008/0070656 A1* | 3/2008 | Somuah | | 463/9 |
| 2009/0144238 A1* | 6/2009 | Paek et al. | | 707/3 |
| 2013/0005486 A1* | 1/2013 | Amaitis et al. | | 463/42 |

* cited by examiner

*Primary Examiner* — Ronald Laneau
(74) *Attorney, Agent, or Firm* — Novel IP

(57) ABSTRACT

The present invention provides a system that allows users to directly participate in advertising resource allocation decisions for advertisers and to actively cause navigation swarms to specific websites. Swarms of users can be enabled by playing a form of hide and seek, where users (hiders) actively hide at a specific network location (the place where a swarm is desired) and other users (seekers) then actively search for the hiding users, thereby creating a swarm effect toward a particular site or set of sites.

18 Claims, 4 Drawing Sheets

METHODS AND SYSTEMS OF ENABLING USERS TO ACTIVELY ALLOCATE ADVERTISING RESOURCES AND PROMOTE FOLLOWER TRACKING

CROSS REFERENCE

The present application is a continuation of U.S. patent application Ser. No. 12/950,184, which relies on U.S. Provisional Application No. 61/262,647, filed on Nov. 19, 2009, and is incorporated herein by reference.

FIELD

The present application generally relates to the field of advertising, and more specifically, it is directed toward methods and systems of enabling users to proactively direct and allocate advertising resources to publishers of audio, video, text, graphical, and other content, to enable followers of a user to track and monitor a user's behavior, and to actively cause navigation swarms to specific websites.

BACKGROUND

With the advent of the Internet, many businesses have focused their marketing to reach customers on the Internet. Online advertising includes displaying banners and other advertisements at search engines and other web sites. When a user accesses a web site or runs a search on the search engine using keywords associated with the advertiser's product or service, a corresponding advertisement is displayed on the user's personal computer.

Presently, advertising is generally allocated by an advertiser or third party acting on the behalf of an advertiser who, looking at demographic data and usage traffic, determines the websites with which the advertisements would be associated. In such conventional models, users' usage patterns implicitly or indirectly guide advertising resource allocation. Users do not directly guide advertising resource allocation because advertisers still need to obtain traffic data, interpret it, and determine what, in theory, is the best way to reach out to target users. Therefore, advertisers are not able to obtain feedback from users, which may be especially valuable for the set of users who are loyal to the advertiser's brand of product or service.

Recent attempts at involving users in advertising include methods of interactive advertising, which involve use of interactive media (mainly internet) to communicate with consumers and to promote products, brands, and services. Such methods, however, do not involve the users in the decision making process regarding where the advertisements are to be published. The decision of selecting appropriate websites for publication of advertisements (interactive or otherwise) is still based on assumptions derived from usage statistics such as the number of hits a website receives. These assumptions cause the advertiser to lose out on dedicated groups of users, who may not be large in numbers, but are significant due to their loyalty for a particular kind of content.

It is therefore desirable to have an arrangement which enables advertisers to have their customers, patrons, or users directly participate in advertising resource allocation decisions. Further, it is also desirable to have a system that can be configured to place greater weight on the decisions or input of more valuable users, such as those who are loyal to the advertisers' brands.

It is also desirable to have a system in which a user can announce to third parties, including followers of the user, as to where the user is navigating, thereby enabling third parties to follow and track the user as he or she navigates.

SUMMARY

The aforementioned and other embodiments of the present shall be described in greater depth in the drawings and detailed description provided below. The term "user" shall be understood to mean an individual from whom data is being transmitted, or to whom data is being received, through operation of a computing device, including, but not limited to, mobile devices, tablet computers, desktop computers, laptops, or other devices comprising a computer processor and associated memory. In one embodiment, the present invention is directed toward a method for playing a hide and seek game on the Internet, said method being managed by at least one server wherein said server is programmed to practice the method for playing a hide and seek game, comprising the steps of: receiving from a first user a signal indicating that the first user is hiding at a first network location, transmitting to a plurality of second users a signal indicating the hidden status of the first user, receiving a signal indicating that at least one of said plurality of second users is submitting at least one guess that the first user is hiding at a second network location, and transmitting a signal indicating a completion of said hide and seek game to the first user and one or more of said plurality of second users when said second network location is the same as the first network location.

Optionally, the method further comprises the step of receiving an input from the first user defining at least one of a time period for the hide and seek game, a plurality of hints to be provided to said plurality of second users, identifying information for said first user, or identifying information for said plurality of second users. Optionally, the method further comprises the step of receiving from the plurality of second users an indication that each of said second users shall attempt to seek the first user.

Optionally, the method further comprises the step of transmitting to a plurality of second users hints indicating an identity of the first network location. The said hints are derived from metadata associated with said first network location. The hints are provided by the first user. Optionally, the method further comprises the step of receiving from at least one of said plurality of second users questions regarding an identity of the first network location. Optionally, the method further comprises the step of transmitting the questions regarding an identity of the first network location to the first user and receiving responses to said questions from the first user. Optionally, the method further comprises the step of transmitting the responses to said questions from the first user to said plurality of second users. Optionally, the method further comprises the step of filtering the responses to said questions from the first user prior to transmission to said plurality of second users. Optionally, the method further comprises the step of enabling the plurality of second users to identify the first user by submitting a search request into a database.

In another embodiment, the present invention is directed toward a system for playing a hide and seek game on the Internet, comprising a computing device having a processor, a memory, and a plurality of programmatic instructions, wherein, when executed, said programmatic instructions enable the system to: receive from a first user a signal indicating that the first user has chosen to hide at a first network location, transmit to a plurality of second users a signal indicating the hidden status of the first user, and receive a signal indicating that at least one of said plurality of second users is submitting at least one guess that the first user is hiding at a second network location.

When executed, said programmatic instructions also enable the system to transmit a signal indicating a completion of said hide and seek game to the first user and one or more of said plurality of second users when a predefined time period has elapsed, wherein the predefined time period elapses before the at least one of said plurality of second users submits at least one guess that the first user is hiding at the second network location, wherein the second network location is the same as the first network location. When executed, said programmatic instructions also enable the system to receive an input from the first user defining at least one of a time period for the hide and seek game, a plurality of hints to be provided to said plurality of second users, identifying information for said first user, or identifying information for said plurality of second users. When executed, said programmatic instructions also enable the system to receive from the plurality of second users an indication that each of said second users shall attempt to seek the first user. When executed, said programmatic instructions also enable the system to transmit to a plurality of second users hints indicating an identity of the first network location. The hints are derived from metadata associated with said first network location. The hints are provided by the first user. When executed, said programmatic instructions also enable the system to receive from at least one of said plurality of second users questions regarding an identity of the first network location.

BRIEF DESCRIPTION OF THE DRAWINGS

These and other features and advantages of the present invention will be further appreciated, as they become better understood by reference to the detailed description when considered in connection with the accompanying drawings wherein.

DETAILED DESCRIPTION

The present application discloses embodiments that enable advertisers to have its customers, patrons, members or subscribers (generally and collectively referred to as users) directly participate in advertising resource allocation decisions. The present application discloses embodiments that also automatically assign weights to users' opinions, for example by giving greater weightage to the decisions or input of more valuable users. This allows advertisers to leverage opinion of customers such as those with a higher membership plan, those who spend more money, those who visit the advertiser's stores or sites more frequently, or those who are generally more valued.

The present invention is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Figure 1:
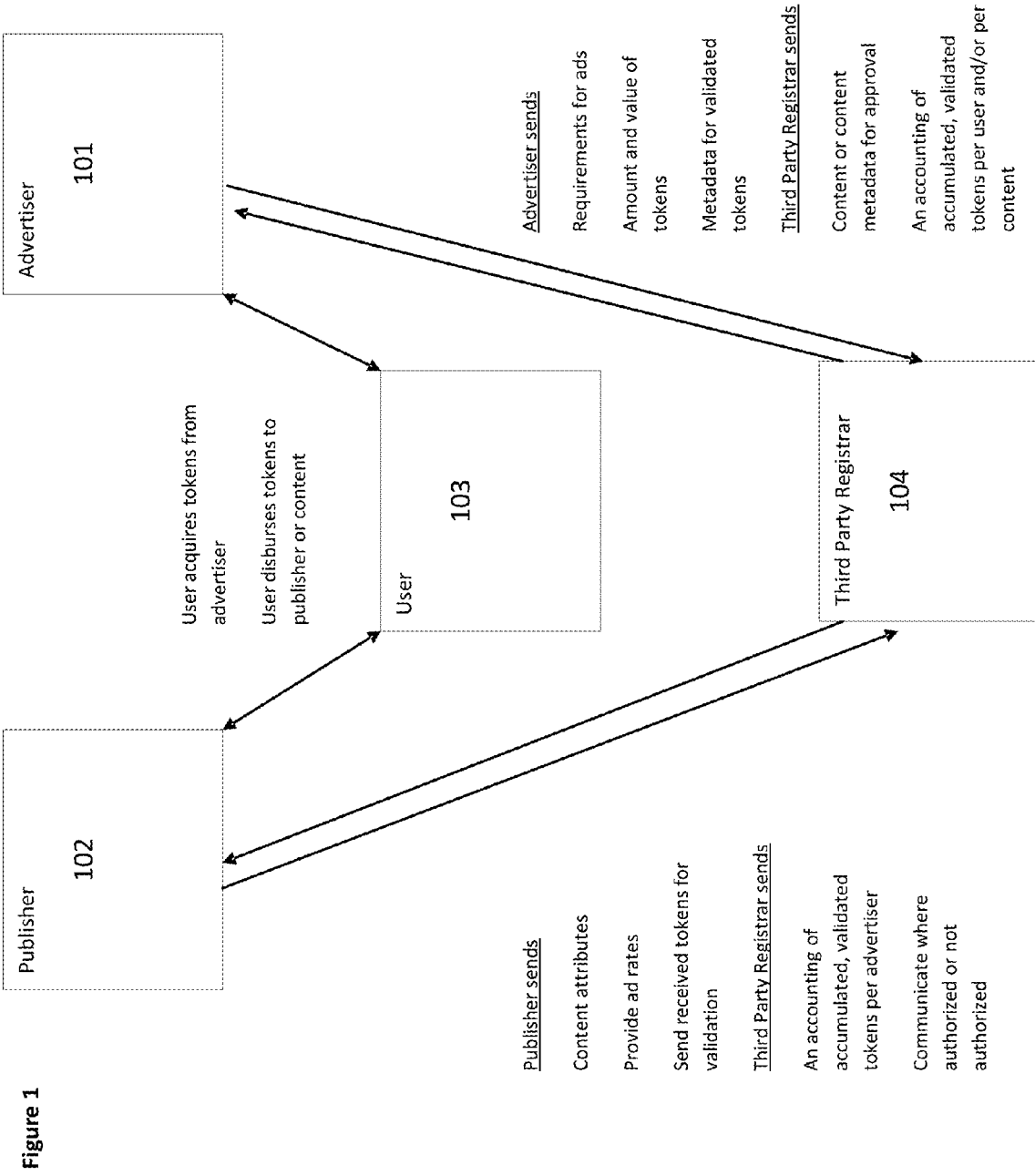
FIG. 1 is a schematic diagram illustrating the interaction between various components of the present invention.

FIG. 1 provides an overview of the various entities in the system of present invention and their interrelationships. Referring to FIG. 1, an advertiser 101 chooses to display its advertisements on media, such as websites, through a publisher 102. However the choice of publisher (or website) is based on the feedback from the users 103, who use the advertiser's product or service. The system of present invention also includes a third party registrar 104 which co-ordinates between the advertiser 101 and the publisher 102 for accounting and validating user feedback. The above-mentioned entities and their functions are described in further detail as follows:

Advertiser

In one embodiment, an advertiser installs programmatic modules on the servers of its website. These modules are used to present an interface to a user, which in one embodiment is in the form of a toolbar, Flash application, Java program or other client-side executing software application. Through the interface, the user is allocated virtual tokens. In one embodiment, the tokens are presented using any visual icon and in any computing script, including Java Script. One of ordinary skill in the art would also appreciate that the user interface may take any form suitable to achieve the purpose. In one embodiment, tokens are allotted only to users who have established profiles with the advertiser's website. In one embodiment, the advertiser's website provides an application for download that can run on user's desktop, PC, mobile phone or any other smart device. This application, known as the 'client side wallet' allows storing tokens from various advertisers on the user's smart device in a categorized manner. In one embodiment, the tokens may be dragged and dropped, or automatically deposited in the 'client side wallet'. This application also allows tokens to be searched based on type of advertiser, name of advertiser, or visually based on the token appearance. Once found, the tokens can be dragged and dropped from the client side wallet into a 'token receptacle'. The 'token receptacle' is another application running on the publisher's website, and is described in further detail later. Tokens may also be dragged and dropped from a website into the token receptacle.

Advertisers may preferentially allocate tokens to users based on any number of variables, including, but not limited to a) how often the user visits the advertiser's site, b) the user's membership or subscription level, c) the amount of money the user spends, d) the number of miles, points, or other benefits accumulated by the user, e) the extent or degree of the user's participation in advertiser programs, website surveys, or other interactive features, and f) the extent or degree of user input into blogs, opinions, ratings, or other services, among other features.

In one embodiment, the tokens allocated by the advertisers are preferably coded with a secure identity so that they cannot be duplicated, manufactured, or otherwise created without approval from the advertiser. Further, each token, or set of tokens, is/are preferably unique so that it/they can be verified and associated with a particular advertiser, a particular program, and/or a particular user. In one embodiment, each token can further be encoded with a specific set of attributes, including which publisher it can be used for, a value indicating the importance of the user (i.e. a high value user), a value indicating a right to obtain certain goods or services, values representative of the user him or herself, such as gender, age, relationship status, among other attributes. Each token may be assigned a nominal, or arbitrary value unit, depending on how many tokens the advertiser wishes to issue and the relative weight for each unit he wishes to assign. Finally, a single advertiser can issue more than one category of token, with certain tokens having higher values than other tokens. This allows the advertisers to thereby reward their most loyal or valued users, for example by issuing them a higher valued token, and provide incentives new users for performing certain actions, in order to qualify for the higher valued tokens.

For example, a credit card company can allocate tokens to its credit card users. The credit card users will find tokens allocated to them in their on-line account. The tokens may be specifically coded, and even visually represented, as being different depending upon a) the amount the user spends per annum, b) the specific programs or services for which the credit card user is enrolled with the credit card company, or c) the kinds of products or services for which the credit card user is eligible, among other attributes. The credit card user can download or remotely access these tokens using any computing device, including laptops, tablet computers, desktop computers, or mobile devices while accessing the Internet or other network and allocate the tokens, as desired, to the appropriate publishers.

In another example, a consumer product company, such as a car, appliance, or retail company, can allocate tokens to its users. The users will find tokens allocated to them in their on-line account. The tokens may be specifically coded, and even visually represented, as being different depending upon a) the amount the user spends per annum, b) the specific programs or services for which the user is enrolled with the credit card company, or c) the kinds of products or services for which the user is eligible, among other attributes. The user can download or remotely access these tokens using any computing device, including laptops, tablet computers, desktop computers, or mobile devices while accessing the Internet or other network and allocate the tokens, as desired, to the appropriate publishers.

Users

Once the user has an allocated set of tokens, he or she may disburse them to publishers. That is, users make the decision regarding which publishers they want the advertisers, from whom they received tokens, to be associated with. It should be appreciated that the disbursement can occur via any network, through any computing device, and through a local client application or by remotely accessing an on-line token repository.

Publisher

A publisher can be any provider of content, including website content, podcasts, blogs, forums, or any other form of video, audio, or graphic images. In one embodiment, a publisher installs programmatic modules on the servers of its website that are capable of providing users access to an on-line accessible virtual token receptacle. The virtual token receptacle is an application that allows users to collect tokens from advertisers and disburse them to publishers. The virtual token receptacle may have any visual appearance including that of a coin slot, a wallet, a bin, a container, a sign, icon, or any other visual depiction. In one embodiment, the virtual receptacle may be accessible on-line via any networked or cellular-accessible device. Using this application, a user can then deposit a plurality of his or her acquired tokens, from any number of advertisers, into the publisher's token receptacle. When a certain number of tokens are accumulated in a publisher's token receptacle corresponding to a particular advertiser, the publisher is eligible to obtain sponsorship from that advertiser. The number of tokens required by a publisher to obtain sponsorship depends on the publisher's advertising rates.

It should be appreciated that a plurality of controls can, and should, be placed on the token allocation process. In one embodiment, publishers are required to register and qualify to receive tokens. In one embodiment, publishers sign up at a third party site which then issues the publishers with a qualified token receptacle. In this manner, the token issuance and receipt process can be subject to encryption and authentication to avoid theft or spoofing. The third party website may also be authorized by advertisers to review publishers' content. Further, based on the review, the qualified token receptacle may be pre-programmed to reject tokens from advertisers who have not approved the publishers' content. In one embodiment, a programmatic module determines the acceptability of a token, based on the identity of a token which reflects the advertiser or program that issued it. Thus, if a user attempts to allocate tokens to a publisher, and if the publisher is not approved by the advertiser or doesn't otherwise meet certain pre-established advertiser criteria, the tokens are rejected and not allowed to be inserted into this publisher's token receptacle. In one embodiment, an advertiser can reduce or eliminate a user's token account if the user gives the tokens to unauthorized sites or disallowed content.

One of ordinary skill in the art would appreciate that besides registering for a token receptacle, the system should also maintain transparency regarding advertising rates and other parameters established by publishers. To that end, in one embodiment, as tokens are inserted, the token receptacle provides a visual display reflecting how far the publisher is from getting sponsorship from a particular advertiser. That is, the modules associated with the token receptacle dynamically record and update an apparent increase in value in a cumulative manner for all the tokens (which may be of varying values) inserted into the receptacle. In one embodiment, the publisher's site or content site may optionally display the collective allocation of tokens that it has received from users in a box or window. The allocation may be displayed by displaying the total amount of tokens received on an advertiser-by-advertiser basis, so that for example, the window displays Brand A at m thousand tokens and Brand B at n thousand tokens, and so on. Further, the display may be graphical, such as in the form of bar graphs or charts, or in textual form. In one embodiment, data including the amount of tokens received over a particular period of time, the amount of tokens required to get to a desired threshold—in case of a new advertising campaign or high level sponsorship, the topmost token sources (advertisers), the top users giving tokens, etc., are displayed. Essentially, it permits publication of the amount, extent, source, and channel of tokens given to the content site.

The optionally feature of visually displaying how far the publisher is from obtaining advertising from a particular advertiser is a function of a) the publisher's advertising rate, and b) the number of tokens from a particular advertiser. In one embodiment, this feature is preferentially displayed to users based on the publishers' discretion.

Once the number and value of tokens inserted from a particular advertiser meets a threshold value for a particular advertising rate, a message is communicated to a third party management server and to the advertiser's servers. At this point, an advertisement which meets the publishers' requirements can be communicated to the publisher. After publishing an advertisement, the publisher has the option of either zeroing out the token receptacle balance and starting again, or keeping the balance and letting the token balance increase to a higher ad rate.

Furthermore, the publisher can use the token data to preferentially deliver services to token-donating users. In one embodiment, the publisher receives an allocation of a token from a user, reads the token value and any other metadata associated therewith (which may be directly encoded with the token or available through a remote lookup of the token data using a code embedded in the token itself, thereby decreasing the potential for spoofing), and delivers products or services in accordance with that metadata. The metadata may include name, physical address, contact information, phone number, cell phone number, email address, gender, geographical location, zip code, time zone, subject matter interests, data representative of how valuable the user is, data representative of what kind of services, products, or programs the user is enrolled in at a particular advertiser, data representative of what kind of services, products, or programs the user may be eligible for at the publisher, the advertiser that allocated the token, the advertiser's details including company name, address, areas of business, type of advertising willing to be sponsored, among other data.

Third Party Registrar

In one embodiment, a third party site functions as the registrar for publishers who wish to participate in, and be eligible to receive, advertisements based on the presently disclosed token system. The third party site executes programmatic modules on its server to generate a plurality of interfaces through which publishers can input descriptions of their content, provide links to content, and provide general advertising rates for their content. The interfaces present questions to publishers that are specifically designed to ensure that advertisers get the required details about the publishers' content. Further, the content input by the publishers is subject to review and authorization by the advertisers. The third party site co-ordinates between the advertiser and publishers and transmits lists of acceptable content to the advertiser. The third party registrar may also use the lists to modify the tokens in a manner that ensures the tokens work at approved publishers but do not work at unapproved publishers.

In one embodiment, the present system generates valuable reports for advertisers as well as publishers. These reports include:

a. For the publisher—profile of users, including demographic data, data regarding their relative value to an advertiser, and data regarding their right to receive certain services or products, who are most interested in the publisher's content. The profile is in terms of the brands, products, or services used by the users.

b. For the advertiser—sites where the most loyal or valued users/customers of an advertiser congregate outside of the advertiser's environment. These kinds of reports may further point to other potentially valuable customers and educate the advertiser at so where the advertiser should advertise, possible external to its existing advertising networks.

It should be appreciated that the present invention is directed toward an advertiser computing system, particular a server, and a publisher computer system, particularly a server, each having a memory that stores the respective aforementioned programmatic modules and each having at least one processor that executes the aforementioned programmatic modules.

In another embodiment, a toolbar, browser, or other program installed and present on a user's client device, including applications which execute dependent upon, or independent of, a browser, monitors the websites, podcasts, video, or other content visited by a user on-line. One of ordinary skill in the art would appreciate that as used herein, the term client device includes all kinds of computing devices such as personal computers, laptops, PDAs, mobile phones, and media players, that allow users to connect to the internet. In one embodiment, the client program installed on the user's computing device uses web browsing history to compile a list of sites across multiple users that have been visited but which are not part of the token allocation system, and then contact those sites to educate them on how they can maximize their advertising revenues by being a part of the system.

In another embodiment, whenever the client application detects content that is eligible for advertising resource allocation, a notification is made to the user. The notification can be in the form of a banner, a highlighted icon, a popup window, a text alert, or any other visual or auditory indication. In one embodiment, the notification is in the form of an icon located on a client application that lights up or activates when it has detected content that accepts tokens. The website corresponding to that content may be registered with a back-end database associated the third party site (registrar). Thus the client program, or the toolbar, consults this database and indicates to the user content available for allocating advertising tokens. A user, now informed that the content the user is visiting is eligible for advertising resource allocation, can allocate some of the tokens received from an advertiser or from a third party site associated with the advertiser. Such allocation may be performed by moving tokens from one visual location into a particular file, folder, or icon, clicking on a counter, moving a visual wheel, or any other input that serves the purpose. A person of ordinary skill in the art would appreciate that the allocation is visually or logically limited to the amount of allocation the user has available.

In one embodiment, any token allocation for a particular advertiser is recorded by the third party site (registrar) and reported to the advertiser. The advertiser may then use this information to select publishers for its advertisements, as described above. Any token allocation is also reported to the content provider (publisher), who may then advertise such increased advertisement resource allocation or approach the advertiser directly. It can also gray out those tokens which can't be accepted at the particular content site you're at (because that content site is not approved by the particular advertiser).

In one embodiment, the client program also provides the user with an ability to indicate a desire to allocate resources to the publisher, even if the publisher is not already pre-approved to receive it. In such an embodiment, when the user visits a publisher's page, he or she simply allocates resources by moving tokens to an icon, clicking on a value indicator, or any other suitable form of input. The client program records such allocation in association with the content provider's page, URL, or other identity. The client program then transmits such allocation and the content provider's identity to a third party administrator who then reports the information to the advertiser whose tokens were allocated and to the content provider itself. Based on this information, the advertiser may take a decision to advertise with the said content provider.

As mentioned earlier, the present system generates reports that bring out user patterns on token allocation. These reports are generated by programmatic modules at the third party registrar site, and the client program at users' end that keep track of the tokens allocated, for all advertisers and publishers, as well as users. In one embodiment, token allocation data is represented graphically and posted at one or more of the advertiser/token provider's site, at the publishers' sites, where content is located, on toolbars located on users' computers, or a central site.

In one embodiment, this data is used to illustrate to users statistics such as which users are the most prolific distributor of tokens, which users have the most tokens to distribute, which content draws most token from an advertiser, and who are the users that distribute to that particular content the most, etc. In one embodiment, such data is updated in real time on all the sites it is posted on. As mentioned earlier, users may be rewarded by advertisers with incentives, including points, miles, free gifts, etc for distribution of their tokens. Users may also be rewarded in a similar way by publishers (content providers) for bringing advertising to them by allocation of tokens. Accordingly, a user will be able to see how much points (or any other markers of reward) he or she has earned through distribution of an advertiser's tokens, and how many more tokens they need to distribute in order to be eligible for certain incentives or free gifts. Thus, for example if a user is a member of a site that offers movies and music for download, and the user has been bringing advertising revenue to that site by allocating tokens, the user will be able to see how far he or she is from being amongst the first to download an upcoming release.

In one embodiment, the client side program that records a user's token allocation activity, generates a 'token profile' based on trends in the user's allocation history, such as number of tokens acquired and their sources (specific advertisers) and number of tokens allocated and to which content sites. In one embodiment, a user can view his/her token profile by selecting an icon provided on a toolbar, installed by the client program on the user's computer. A 'token profile' is thus indicative of a user's preferences in token allocation. In one embodiment, the client side application also generates a 'token profile id' that a user can use to log into a content provider's site or an advertiser's site that uses the token allocation and management system of the present invention. Thus, in one application, a user can then log into a site or area that hosts content, and have their token profile sent to the content site. Based on their token profile, the content site, which is an entity attempting to attract advertising may offer the user special deals, special access to events, special access to areas on the site, free trial offers, discounts, rebates, etc.

Alternatively, the client-side program, which in one embodiment is a toolbar, may write token information to a local cookie on the user's computer and then permit or enable content sites to read that cookie. This may be enabled by using an authorized plug-in or script. As above, the content site can then provide many services or benefits to the user based on their token activity data, which provides an incentive to the user to transfer tokens to the content site.

Optionally, the content site may also penalize a user if, after providing access to certain services or benefits, the user fails to transfer any tokens or enough tokens. One of ordinary skill in the art would appreciate that the penalty can be no more access to those higher level services or benefits.

In one embodiment, advertisers may allocate different tokens to the users depending upon any number of variables. For example, a very frequent or high value customer of an on-line store may receive tokens of a different color, size, shape, configuration, etc. than the standard tokens given to other users. Further in this example, the on-line store may post data on its website showing which customer has acquired the most number of 'red' tokens or 'flag-shaped' tokens, indicating a customer's status as preferred user, a loyal user, an influential user, etc.

As another example, a user who agrees to provide greater information about themselves or their preferences, such as by filling out forms, or a user who provides certain services to the site, such as reviewing products, answering other people's queries or post blogs with information helpful to other users, may receive tokens of a different color, size, shape, configuration, etc., than the standard tokens given to other users.

In one embodiment, the client-side program provides applications which interface with social networking sites such as Facebook, Twitter, Linked-In, etc. These applications allow the users to post their token profiles on their respective social networking pages. Further, a user who links his or her token profile to the rest of their social network, may receive tokens of a different color, size, shape, configuration, etc. than the standard tokens given to other users. Still further, data from a user's profile may influence the kind of token they receive. For example, a user with over 1000 friends on Facebook may receive more tokens or higher valued tokens than a user with only 10 friends.

Thus a user's token profile may include, besides the number of tokens and their sources and allottees, the types of tokens available with the user as well. In one embodiment, if a user is visiting a particular content site and wishes to allocate tokens, the toolbar installed by the client program on the user's computer indicates through a visual change any tokens which can't be accepted at the that site, because that content site is not approved by the particular advertiser.

Optionally, an advertiser may offer rewards based on levels of tokens a user receives, with each level corresponding to a predetermined number of tokens. This would work to incentivize users to keep visiting the on-line advertiser's site in order to increase their levels. This is effectuated, in one embodiment, by having a central token management site, or the third party registrar site, that can be accessed through an advertiser's site. Further, optionally, users' token profiles may also be hosted by the central token management site (third party registrar), since it already has the data regarding which advertising tokens have been allotted by users to which sites. Therefore, when a user logs into an advertiser's site, using their token profile id as mentioned earlier, the central site which is linked to the advertiser's site, may present the corresponding profile details to the advertiser. The advertiser may then offer special deals or offers in allocating tokens, especially to users who have achieved certain levels.

One of ordinary skill in the art would appreciate that publishing the token profile of a user allows other users to deduce that user's status in terms of being a high value customer who spends a lot, or person with a large social network, or even a person's interests in terms of his/her loyalty to certain content. This information may also be used by content providers to attract the user based on a user's interests, or a user's influence in a social network. Further, the content providers may seek such users not only as consumers of content they provide, but also as a source of attracting advertisements.

In one embodiment, the toolbar or client program which generates a user's token profile proactively suggests content for the user, based on their preferences derived from browsing history. For example, the toolbar may note from a user's browsing patterns that he likes comedic podcasts. The toolbar may then offer suggestions to visit related sites, where these sites are also a part of the token allocation system.

Figure 2:
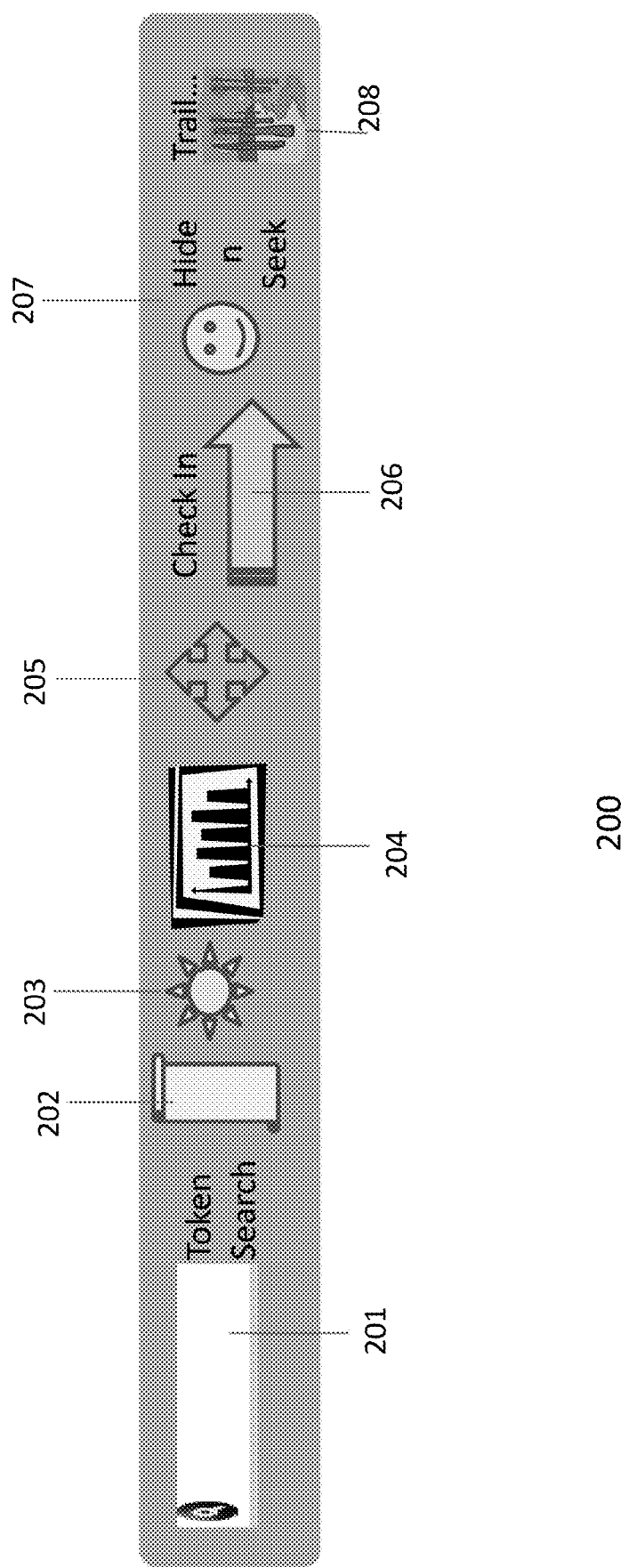
FIG. 2 illustrates an exemplary toolbar that is used as an interface for implementing various functions of the present invention.

FIG. 2 illustrates an exemplary client application 200, which is installed on the user's computing device. The client application is equipped with various buttons and icons to enable various functionalities in accordance with the present invention. Referring to FIG. 2, the client application provides a search bar 201, which the user can use to search for tokens. Search criteria may include advertiser's name, token type, advertiser's product category, etc. The toolbar also has an icon 202, clicking on which yields the user's token profile. Icon 203 is related to token allocation, and in one embodiment is designed to change color when it needs to notify something or draw the user's attention. For example, when a user visits a site where tokens can be allocated, the icon 203 flashes yellow. The icon may indicate successful allocation of tokens by the user by turning green. Further, if the user cannot allocate tokens at a particular site, such as in case of the site content not being approved or the user not being authorized, as described above, the icon 203 turns red to indicate that token allocation is not allowed. Another icon 204 on the toolbar displays statistics such as the highest allocation of tokens at a given site, users who have allocated maximum tokens, most popular advertiser, etc., when a user moves his or her cursor over it. As explained above, the client side application keeps track of the user's browsing history and also offers suggestions based on browsing patterns. Therefore, the toolbar 200 is provided with the icon 205, which when clicked displays a list of suggested sites in another window or as a drop down list. Icons 206, 207 and 208 allow users to participate in games, which are detailed below.

It should be appreciated that the advertising resource allocation can be provided by the advertiser itself or by other parties, including social network sites, portals, search engines, or other entities, who are interested in seeing how users would self-allocate resources to on-line content providers. Fundamentally, this approach is designed to ensure users are empowered to directly participate in resource allocation decisions.

In another embodiment, a client-side application allows users to participate in games, while at the same time generating user data valuable for advertising. Optionally, the client-side application for effectuating these games may be integrated into the browser. In one embodiment, the application is integrated into the toolbar described above. Further, the client-side application may be independent of the browser or just be a java-based or flash-based script, or any type of widget.

Figure 3:
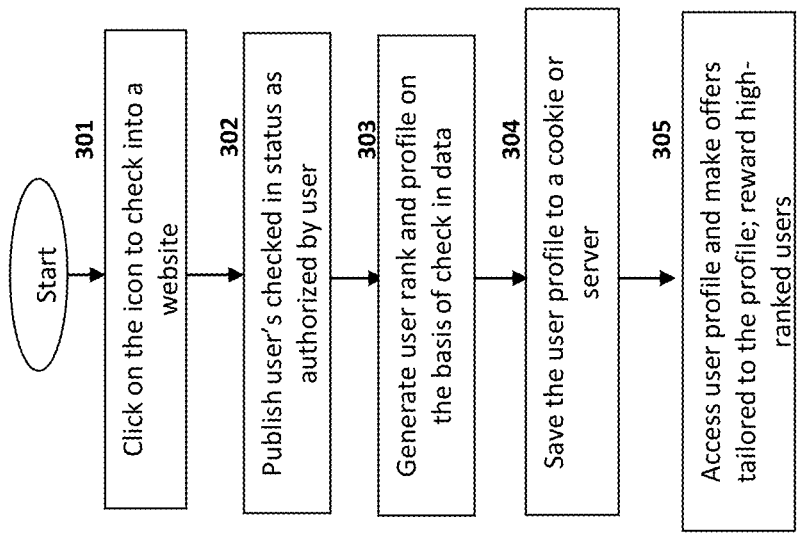
FIG. 3 is a flowchart illustrating a first exemplary manner of generating valuable user data by engaging users in a game.

An exemplary game that a user may participate in is "Check-In". In this game, the client-side application permits users to check into websites. FIG. 3 illustrates, by means of a flowchart how this game is conducted and how it generates useful user data in the context of present invention. Referring to FIG. 3, a user checks into a website, as shown in step 301. This is facilitated by clicking on a "Check In" application icon (refer to 206 of FIG. 2) that is available to a user, when the user navigates to a webpage. The Check In application icon communicates the URL to a server which then publishes this Checked In status, as shown in 302, to all other users of this application, and also to any other networks that the user may be a part of, and which are approved by the user, such as Twitter, Facebook, Orkut, etc.

Check-In data can then be used by the server and the client-side application to generate a rank and profile for the user, as shown in step 303. Thus, users who check in the most at any particular website or affiliated sites get ranked higher and higher. In one embodiment, users are allotted titles in line with achieving a rank or status. Exemplary titles may include "head of a site", "leader of a site", "Crown King", "Minister", etc. These titles may also be published at a variety of sites approved by the user, including social networks. The Check In App carries out a number of user monitoring activities in the background. In one embodiment, the application monitors the websites that the user is checking into and generates a profile of the user. Optionally, the application may recommend other sites the user may be interested in, based on the generated user profile. In one embodiment, the client-side application saves the user's title or status, such as the user being a top status person as described above. The status information may be saved in a cookie or on a server, as shown in step 304, thereby permitting websites to access that status information. The websites may then offer the user privileged access to their products or services, or make other special offers, as shown in step 305. One of ordinary skill in the art would appreciate that status information and other valuable data generated by the client-side application includes information such as which individuals most frequent a site, and access to such information translates into the ability to specifically target such individuals for site owners.

Figure 4:
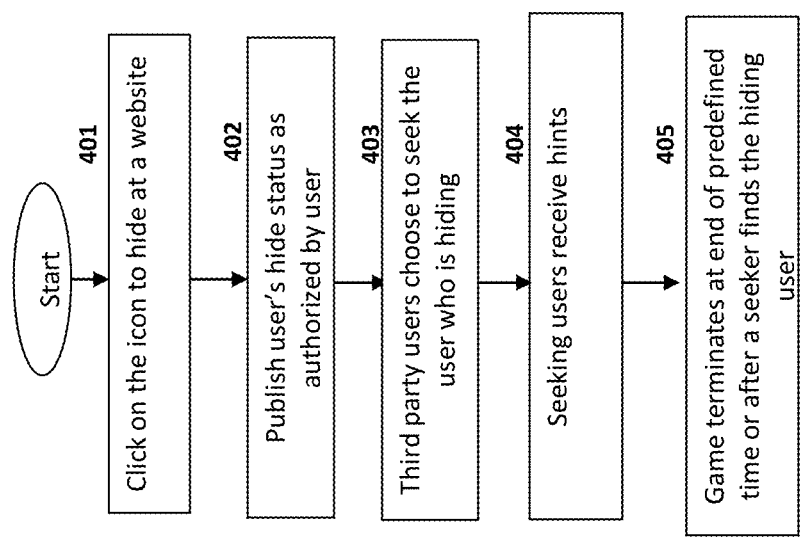
FIG. 4 is a flowchart illustrating a second exemplary manner of generating valuable user data by engaging users in a game.

Another exemplary game enabled by the client-side application is "Hide and Seek", shown in FIG. 4. This game builds up on the Check In App, and allows the users to "hide" at a particular location on the Internet. In one embodiment, the "hide" function is implemented by having the user click 401 on an icon that says "Hide", or some other visual designation, at any website or network location. The user's hide status can then be published 402 to a select group of friends, to all users of the application, or to networks beyond the application, in accordance with user's approval. The user can also designate a particular icon, image, agent, or a character, that will be displayed to all users who decide to seek that user. In one embodiment, the hiding user's icon is displayed on the seeking users' toolbars, browsers, client applications, or in mobile applications. In one embodiment, there is a limit to how many users can "hide" at any given point. If the predefined limit is reached, users are asked by the websites to try again later. In one embodiment, there is also a limit to how long a user can hide, and hiding users are revealed after a predefined period of time.

It should be appreciated that a user can establish a plurality of variables governing his or her Hide-and-Seek game by going to a network location, such as a website hosted, at least in part, by, or in data communication with, a game management server, and defining a plurality of variables, including a) to whom (what users) the user's hide status should be published, b) to what networks or user groups the user's hide status should be published, c) how long the game will run, d) a reward for finding the user, and/or e) hints for finding the user, among other variables.

After a user chooses to "hide" and publishes that status to other users, other users can choose to "seek" 403 that user. Seeking may be effectuated by clicking on an icon in a client application or server based application, which causes a signal to be transmitted to the management server which tracks a) the users who are hiding, b) where the user is hiding, c) what variables the hiding user has defined, d) other variables governing the hide-and-seek game, e) the identity of users who have chosen to seek, f) the provision of hints on a periodic basis, g) the control of the game, and h) which user or users are deemed to have won the game. In one embodiment, a user can seek a hiding user by simply clicking 403 on a "seek" button in response to a notice. Alternatively, a user can choose to seek someone by entering the name/username/id of the hiding user in a standard word look up, which references a database of hiding users in a database in data communication with the management server. Once the user clicks on "seek", the hider's chosen icon is displayed to the user on their toolbar (refer to 207 of FIG. 2), browser, or in a mobile application.

To actually find the hiding user, that is to determine the website where that user chose to hide, the seeker preferably receives 404 hints from the management server. In one embodiment, hints are sent to seekers in pre-established increments of time. For example, the first hint appears on the seeker's computing device immediately after the seeker clicks on "seek". The second hint can happen three minutes later. The third hint can happen five minutes after that, etc. Any increment of time can be used to space hints until the game terminates based on a predefined period of time or until a seeking user finds the hiding user. Alternatively, no hints may be provided. Alternatively, hints may be provided through other networks, such as Twitter, Facebook, email, text message, or other means external to the management server.

Hints can be pre-established in many ways. In one embodiment, when the user chooses to "hide", the system can pose a set of questions to that user, which can later be used as hints for seekers. Exemplary hint questions may include: a) what's your favorite feature on the site, b) what do you dislike most about the site, c) how old is the site, d) what are your other favorite sites in the same category, e) if you didn't go here, where else would you go, etc. The hiding user's answers can be used to provide hints to seekers. In one embodiment, answers provided by hiding users are screened for URL names, etc., to make sure the answers don't contain extremely easy clues.

In another embodiment, the system automatically captures the URL of the site where the user is hiding, parses it, and generates a puzzle, such as a word jumble. Optionally, if the site name is short, the system can make the jumble harder by adding a letter (a vowel or a consonant) and announcing that addition to the seekers. Alternatively, the system can use the metadata of the hider's site location to generate hints. For example, the system may take into account the site category to announce a hint to seekers that the hider is at a location in a news site.

The system may also use that metadata to find similar sites, that is, find other sites that have the same or substantially similar metadata, to provide hints to seekers. For example, if a user is hiding at Orkut (a social networking site from Google), the system may produce a hint that the hider is somewhere in the Google network.

In another embodiment, the first hint is generated by the system, such as a word jumble or questionnaire, and subsequent hints come from seekers. In one embodiment, seekers submit questions to the system, wherein there is a predefined limit to the number of questions that can be submitted by one seeker or a group of seekers. The system then randomly selects a fixed number of questions from the submitted questions. This selection can also be on first come, first served basis. The selected questions are then sent to the hider, who has a predefined time limit to respond. The response then gets broadcast to all seekers.

Optionally, but preferably, seekers can vote on the quality of the submitted questions and even comment on those questions. Seekers with the highest votes get points. The audience can also vote on the quality of the hider's responses. Hiders with the most votes get points too. The hider must be caught before a predefined period of time (or predefined number of questions) elapses.

Playing off the hints, seekers go to sites and then click on the hider's icon or a button provided for the purpose. The button may be titled for example, as "Are you here?" The first seeker (or the first predetermined number of seekers) to find the hiding user at the correct site wins. Winning may be indicated with animation, for example, by showing the hider's icon jumping for joy. If other seekers find the hider subsequently, the hider's icon may be used to indicate that they have lost, for example by waving goodbye or some other action. In one embodiment, the names/usernames/ids of best seekers are published to websites and networks that they have approved of, and they are also rewarded. If a seeker clicks on the icon or the provided button at a wrong website, where the hider is not hiding, then the icon indicates that the seeker is wrong. Again, this indication may be presented in an animated manner, with the hider's icon shaking head to say no, for example. Optionally, the system can inform the seeker if he's "hot" or "cold", with "hot" indicating 'on target' and cold indicating away from it. The system can determine "hot" or "cold" by comparing the site where the seeker is at with the hider's site metadata.

The system may use various methods to reward and recognize users. In one embodiment, hiders who are too quickly found are penalized and those that can remain hidden up to the predefined time limits are rewarded. Similarly, seekers who are the first to find people are rewarded. The rewards may be in the form of deals and special offers from the participating sites, and also by awarding titles, such as king of a site, etc., as explained above with reference to the game "Check In". Further, quality hints are rewarded by votes from other users, and quality questions (from seekers) are also rewarded with points, as explained above.

A person of ordinary skill in the art would appreciate that this game serves to drive people to a particular site—the place where the user is hiding. A swarm effect may be created, resulting in a large number of hits for the website. Additionally, in one embodiment the game application is programmed to store a user's seeking/hiding history in a cookie. This information may be made accessible to website for a fee. The website can then reward users for hiding at their site, by offering privileged access to their products or services or other special offers, thereby driving more people to the site.

In yet another embodiment, the client side application runs another gaming app on the user's computing device, allowing the users to play an exemplary game called "Trail". Using this application, users can leave a trail of which sites they have visited, and the trail is for others to find. One of ordinary skill in the art would appreciate that this application keeps track of users' browsing history to enable them to play this game. In one embodiment, the client side application provides an icon, using which the user can select, for example, whether a) to publish their navigation history in real-time on the sites authorized by them, b) keep track of their browsing, but not publish (optionally the user may later edit their history and then allow publication), c) publish only when they give a specific command, such as pressing a particular button, or d) publish only from one browser window and not another browser window that may be concurrently opened.

One of ordinary skill in the art would appreciate that several other options may be given to the user for managing their browsing history and its publication. Thus, if a user allows so, their navigation is tracked and published as they surf the net. Other users are then allowed to follow the trail of the user who's navigation is being published. In one embodiment, users are provided with a "follow the trail" button on their toolbars (as shown by 208 in FIG. 2) or browser windows. When a user chooses to follow the trail of a publishing user, his or her browser automatically launches the first website, at the beginning of the trail, and then follows through to all the other sites in either a predefined automatic step process or manually by clicking "Next". This game, when played along with 'Hide and Seek' allows users to hide at certain websites and then publish the trail (or a part of it) as a hint. Seekers can then follow the trail to find the hiders. Again, this functionality serves to drive people to particular sites, hopefully creating a swarm effect.

It should be noted that using the above approaches (games), the system can generate a "social rank" for websites. This is achieved, in one embodiment, by a) aggregating data relating to the Check-In (as explained with reference to "Check-In" game), including frequency of Check-In and number of people attempting to "Check-In" to a site and b) prompting users to link in their social networks into the client application and then "spidering" through those social networks to collect and catalog any links cited therein. Of course, the client side application can spider through and gather links only if a user authorizes it to access their network, not otherwise.

When this data is aggregated for all users, it can be determined how often a site or particular set of sites appears within a social context, as opposed to just conventional keyword searching. Using the same data, the system can also generate a "social impact" value for a user, which assesses a user's social network and attributes such as how many links a person has linked with their network, how many friends they have, how often a person checks in, how successfully a person checks in, etc. This data can be used to generate a user profile, as described earlier. The user profile may be saved to a cookie, which can then be used to drive preferential content to a user.

The above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. A system for registering and allocating virtual tokens across a network of third party sites, comprising at least one server programmed to:
   generate an interface for receiving data indicative of published content from a plurality of publishers;
   generate an interface for receiving data indicative of permitted content from a plurality of advertisers and for allocating a plurality of virtual tokens to each of said plurality of advertisers;
   store, distribute, and communicate with, a plurality of client-side applications, wherein each of said plurality of client-side applications is configured to capture a first allocation of virtual tokens from at least one of said plurality of advertisers to a user and a second allocation of virtual tokens from said user to at least one of said plurality of publishers and to communicate said first and second allocations to the at least one server; and
   assign value to a publisher based upon said second allocation.

2. The system of claim 1 wherein the virtual tokens are coded differently depending upon a plurality of characteristics.

3. The system of claim 2 wherein the plurality of characteristics are indicative of an amount a user spends per annum, a service for which the user is enrolled, or a products or service for which the user is eligible.

4. The system of claim 1 wherein a visual appearance of the virtual tokens is dependent upon said plurality of characteristics.

5. The system of claim 2 wherein the system determines if the second allocation is permitted by examining data indicative of published content in relation to said plurality of characteristics of the virtual tokens.

6. The system of claim 1 wherein at least one of said plurality of publishers allocates a plurality of different tokens, wherein said different tokens are assigned different values.

7. The system of claim 2 wherein the system determines if at least one of said plurality of publishers is eligible to receive advertising from at least one of said plurality of advertisers based upon a plurality of second allocations.

8. The system of claim 1 wherein the system generates data indicative of how many virtual tokens are required before a publisher receives value.

9. The system of claim 1 wherein the client application is configured to detect content eligible for virtual content allocation.

10. The system of claim 9 wherein the client application notifies a user when it detects content eligible for virtual content allocation.

11. The system of claim 1 wherein at least one of the first or second allocation is performed by moving said virtual tokens from one visual location into a second visual location associated with the client application.

12. A method for registering and allocating virtual tokens across a network of third party sites, comprising:
   receiving data indicative of published content from a plurality of publishers;
   receiving data indicative of permitted content from a plurality of advertisers;
   allocating a plurality of virtual tokens to each of said plurality of advertisers;
   distributing a plurality of client-side applications, wherein each of said plurality of client-side applications is configured to capture a first allocation of virtual tokens from at least one of said plurality of advertisers to a user and a second allocation of virtual tokens from said user to at least one of said plurality of publishers;
   receiving data indicative of said first allocation and said second allocation from each of said plurality of client-side applications; and
   assigning value to a publisher based upon said second allocation.

13. The method of claim 12 wherein the virtual tokens are coded differently depending upon a plurality of characteristics and wherein a visual appearance of the virtual tokens is dependent upon said plurality of characteristics.

14. The method of claim 13 further comprising determining if the second allocation is permitted by examining data indicative of published content in relation to said plurality of characteristics of the virtual tokens.

15. The method of claim 12 further comprising determining if at least one of said plurality of publishers is eligible to receive advertising from at least one of said plurality of advertisers based upon a plurality of second allocations.

16. The method of claim 12 wherein the client application is configured to detect content eligible for virtual content allocation.

17. The method of claim 16 wherein the client application notifies a user when it detects content eligible for virtual content allocation.

18. The method of claim 12 wherein at least one of the first or second allocation is performed by moving said virtual tokens from one visual location into a second visual location associated with the client application.

* * * * *